United States Patent Office 3,320,946
Patented May 23, 1967

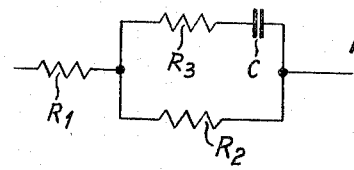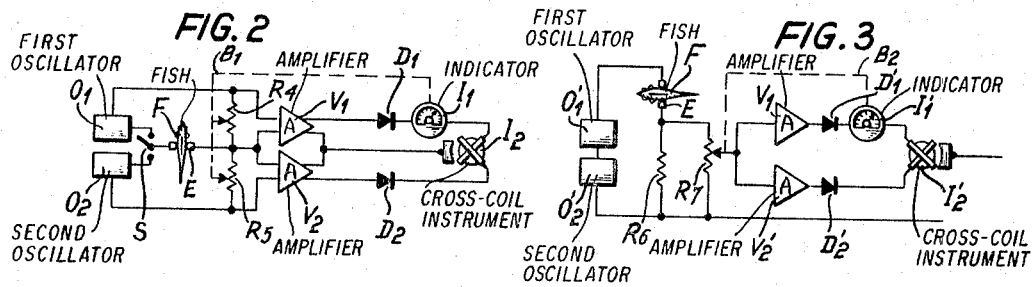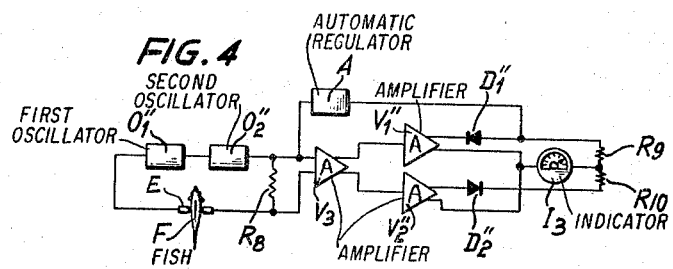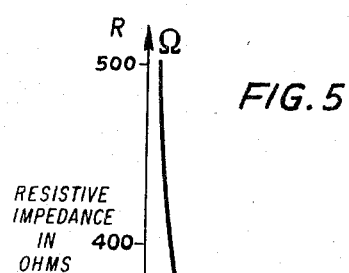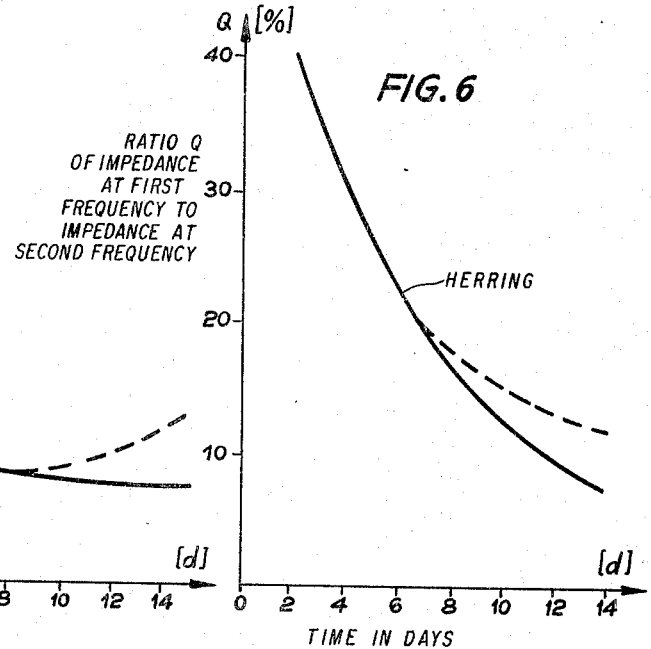

3,320,946
METHOD AND MEANS FOR TESTING
CELLULAR TISSUES
Jürgen Dethloff, Marienhöhe 5, Hamburg-Blankenese, Germany, and Christian Hennings, Hamburg, and Carl Heinz Ulrichs, Hamburg-Blankenese, Germany; said Hennings and said Ulrichs assignors to said Dethloff
Filed July 29, 1963, Ser. No. 298,498
Claims priority, application Germany, July 30, 1962, D 39,497
17 Claims. (Cl. 128—2.1)

Our invention relates to a method and a device for examining the physiological condition of vegetable and animal cellular tissues, especially for the determination of the freshness and quality of useable fish, with the aid of the electric alternating-current resistance or impedance.

The method according to the invention and the device for carrying out the method are to serve inter alia to ascertain the tenderness of the fruit flesh of fruits absolutely or comparatively, to determine morbid modifications such as swellings, growths, tumors in tissues according to nature and position, to ascertain tissue modifications which occur after the death of an organism due to enzymatic decomposition of the cell walls and thus possibly subsequently to reconstrue the moment of its death, to follow the length and depth of the rigor mortis in animal organisms and to determine the state of freshness of vegetable and animal food-stuffs in the raw state objectively, rapidly and reliably on the spot. More especially, the method and the apparatus are intended to make it possible for members of the fish industry, also the fishmonger, to purchase and pay for his raw goods according to objective standards of freshness and quality without prior visual inspection, that is dispensing with the auction procedures at the fish markets which today are still indispensable but are harmful to quality; it is to give the fishing boat captains on board the catching ships a constant view of the state of freshness of the catch already stored in the fish hold and thus to impart to them a basis for their arrangements, and it is intended to serve for the scientist as a simply operated, transportable, analysis apparatus in examinations in which measures for the extension of durability and maintenance of quality are tested. The official foodstuffs inspection could finally make use of the apparatus in order to examine the satisfactory nature of the goods coming on to the market, as for example the veterinary official at the fish market, who has to examine the landed catches for fitness for use, that is primarily for their freshness.

It is already known that the electric resistance of animal tissues decreases with increasing duration of storage, and a method and an apparatus have also become known which permit the immediate measurement of the specific electric resistance independently of the temperature and thus the ascertaining of a certain measure for the state of freshness. However apart from the fact that the built-in temperature compensation necessitates a complicated arrangement and calibration, the method has the following disadvantages:

(1) The driving of the measuring head into the tissue to be measured damages the tissue and the skin, so that thus entry sites for a bacterial infection are provided and the measured object becomes useless for further measurements.

(2) The specific electric resistance of a fish travels during its time of storage in ice in a curve which drops off steeply in the first 3–4 days after catching, but then from approximately the fifth to the fourteeth day of storage possesses only a very slight inclination towards the storage time axis, and furthermore is unsure due to greatly divergent individual values, so that in the period in question only very limitedly usable conclusions can be drawn from the resistance values as to the degree of freshness (see FIG. 5 of the drawings which are to be explained hereinafter).

(3) The specific conductivity of the tissue water in each case, which normally increases in the course of storage, contributes decisively to the size of the resistance value of the tissue after the elapse of the first 3–4 days of storage. Since however during the ordinary storage of the fish in ice (or even in chilled water) an osmotic exchange takes place between the electrolyte-containing tissue water and the molten ice water, through the skin, practically this results in a dilution of the tissue water increasing with storage time, which water thus is reduced in its conductivity. Thus the drop in the specific resistance of the muscular tissue during storage is retarded in a manner which cannot be inspected, and even increased in unfavorable cases, and can then no longer serve as a measure for the freshness of the fish (see the curve in chain lines in FIG. 5).

(4) The varying fat content (approximately between 28% and 5%) of the most important usable fish, namely the herring, decisively influences the specific resistance of its muscular tissue, so that the specific resistance value could at most, with simultaneous knowledge of the fat content, provide a reference point for its freshness.

The invention now starts from the fact known per se, that vegetable and animal tissues offer for electric current a complex resistance which is frequency-dependent by reason of a capacitative component. Considerations to be set forth further in the course of the following description, and practical tests, have shown that by way of the alternating current resistances measured at different frequencies one can obtain an unequivocal information on the state of vegetable and animal cellular tissues, by measuring simultaneously or in rapid succession, under similar conditions, with weak currents and different frequencies, the resistances occurring at a selected point on the measured object, and then using the ratio of these resistances measured at different frequencies as testing value. This resistance measurement can take place with two alternating currents, the frequencies of which lie in the range between 0 and several hundred kc. It is also possible to effect the resistance measurement with a white (multiple frequency) noise current, and to measure the different resistances occurring on the measured object for the high and low noise proportions. The measurement currents in all cases should be kept in the order of magnitude of a few milliamperes and preferably below one milliampere.

In the carrying out of the method according to the invention the voltage drops on a resistance lying in series with the measured object can be measured, or the measurement voltages are applied through series resistances to the measured object and the different voltage drops occuring on the measured object at different frequencies can be taken as a function of the frequency-dependent resistances.

A device for carrying out the method according to the invention is characterized in that two oscillators of different frequency are connected in series with the measuring section and an induction-free measurement resistance of lower ohmic value than the measured objects, and that the frequency-dependent voltage drops occurring on this resistance are amplified, rectified separately according to frequency and after a combination in a quotient-former are brought to indication. More expediently an automatically working regulating section is used, which adjusts the two input values of the quotient-former in the direction of keeping the one input value constant. Here the voltage drops occurring across the measurement resistance can be passed through a coupling capacitor to a voltage divider which consists of a semiconductor diode operated more or less in the conductive direction, and a series resistance, and to the tap of which there is connected the input of the measurement amplifier, the voltage divider being energized by a control direct current which is dependent upon the actual value of the input voltage.

A further feature of the device according to the invention consists in that the measurement amplifier possesses two separate end stages for high and low frequency and in that between these end stages and the common driver of these two end stages there are provided separate negative feedback paths for high and low frequencies, the negative feedback being made fixed in the end stage from which the adjusting value is tapped and the negative feedback in the other end stage being made variable for the adjustment of the zero point.

Further details and features of the invention will appear from the following detailed description and the accompanying drawings, in which there are illustrated by way of example preferred forms of embodiment of the invention, and wherein:

FIG. 1 is an electric equivalent circuit diagram for animal or vegetable cellular tissues;

FIG. 2 is a block circuit diagram of an embodiment of apparatus of the present invention in which the oscillators are switched into the circuit by a switch;

FIG. 3 is a block circuit diagram of another embodiment of the present invention in which the oscillators are connected in series with the object to be tested and a test resistor;

FIG. 4 is a block circuit diagram of still another embodiment of the present invention in which the oscillators are connected in series with the object to be tested and a test resistor and the voltage across the test resistor is preamplified before it is supplied to the amplifier;

FIG. 5 is a diagram illustrating the variation of the ohmic resistance of cellular tissues in dependence upon the storage time;

FIG. 6 is a diagram corresponding to FIG. 5 in which the ordinates, in place of the ohmic resistance, indicate the ratio of two resistive impedances measured at different frequencies;

Figure 7:
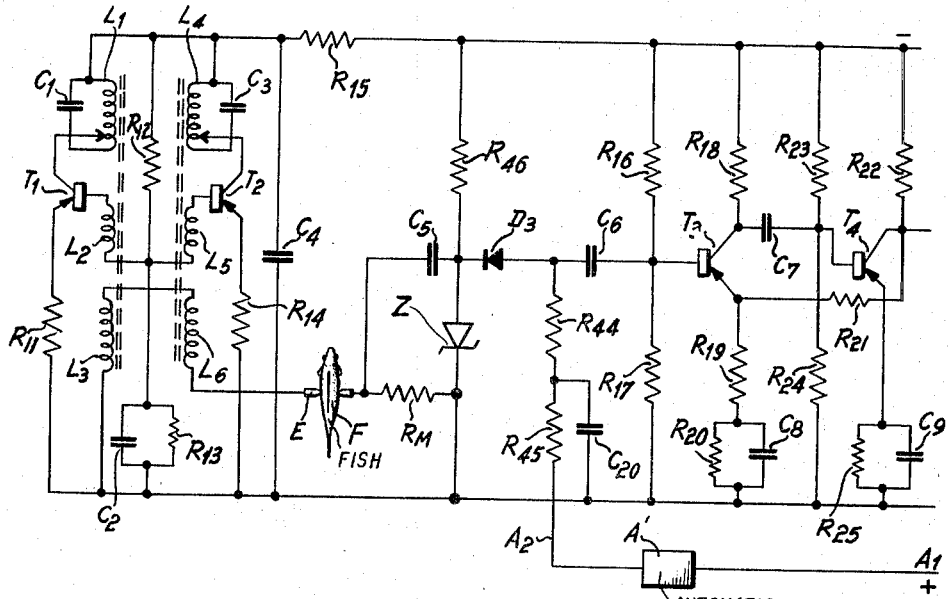
Figure 8:
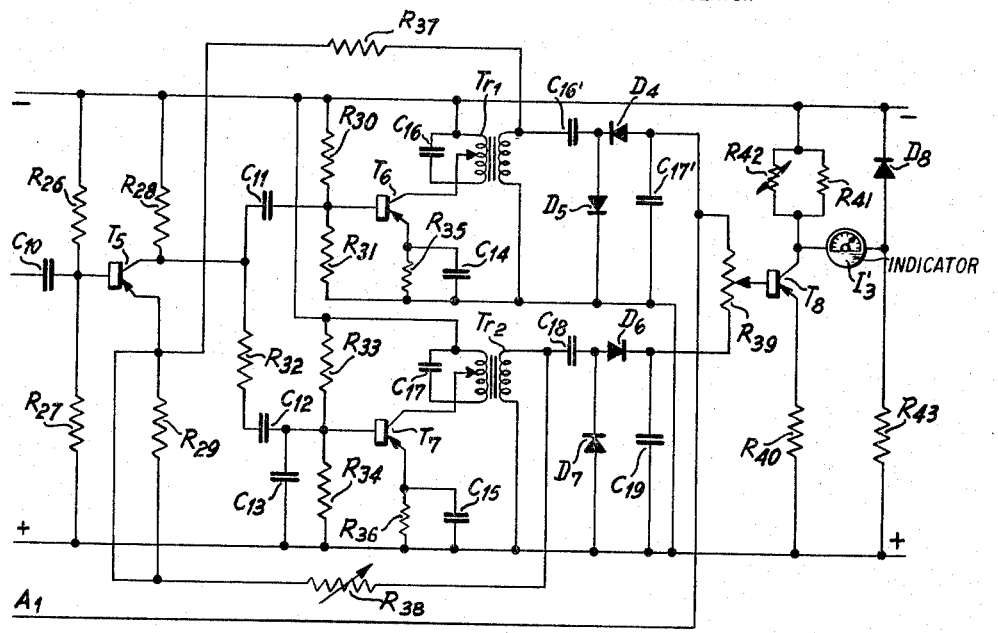
Figure 9:
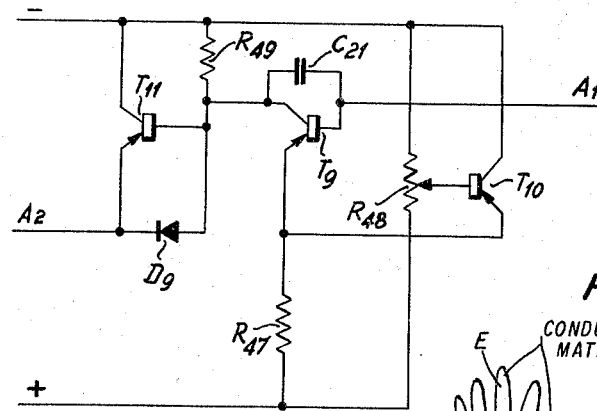
Figure 11:
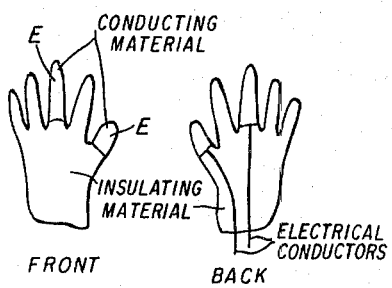
Figure 10:
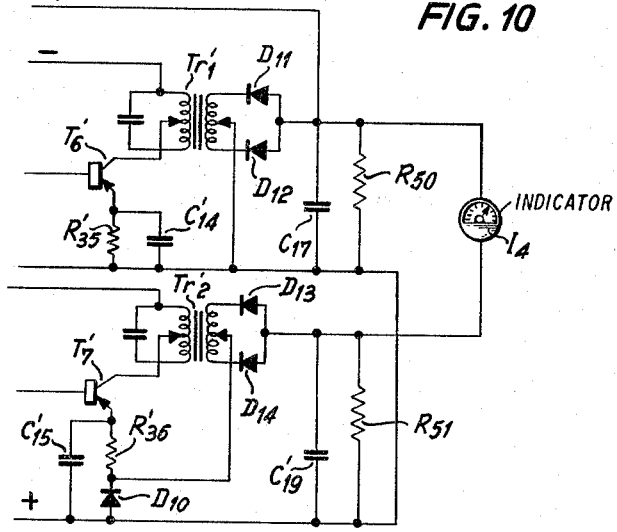

FIGS. 7 and 8 together are a circuit diagram of the embodiment of FIG. 4;

FIG. 9 is a circuit diagram of the regulating amplifier of FIG. 7;

FIG. 10 is a circuit diagram of a modified indicator circuit arrangement, which can replace the indicator circuit arrangement of FIG. 8; and FIG. 11 is a schematic diagram of a device for applying the electrodes of the apparatus of the present invention to a specimen.

As already indicated in the introduction, the present invention starts from the known fact that the electric behavior of vegetable and animal tissues can be explained by a so-called equivalent circuit diagram, which is shown by FIG. 1. According to this the electric resistance of the tissue is composed of ohmic and capacitative components. The ohmic resistance R1 is the resistance of the intercellular liquid (tissue water), the resistance R2 is the resistance of the cell content, and the ohmic resistance R3 is the resistance of the cell membrane or cell wall and the condenser C is the capacitance which is caused when current flows by charge blockages on the cell wall (diffusion hindrance). The resistance represented in FIG. 1 becomes frequency dependent due to the capacitative proportion. It is thus seen from FIG. 1 that the equivalent circuit of the cellular tissues comprises the resistance of the intercellular liquid connected in series to a closed loop comprising the series connection of the resistance of the cell content, the resistance of the cell wall and the capacitance produced by current flow due to charge blockage on the cell wall.

If one enters in a diagram the resistance of cellular tissue, measured between two electrodes, in dependence upon storage time, one obtains a representation according to FIG. 5. This curve has a somewhat hyperbolic character, so that precisely in the measurement range of greatest interest, that is in the case of relatively long storage times, the curve is not particularly informative. There is however also the fact that, as already mentioned briefly at the commencement of the description, the curve representation can become ambiguous if in fact due to the dilution of the tissue water by the molten ice water the resistance values rise again, as represented in broken lines in FIG. 5. Here it must also be taken into consideration that the measured values fluctuate quite considerably from measured object to measured object. The use of different measurement frequencies leads practically to similar curves, which fluctuate and can become ambiguous in the same manner.

The measurement result has a quite different appearance if in place of the resistance value the ratio of two resistances measured at different frequencies is entered as ordinate as a function of the storage time. A curve with constant course is then produced, which also can no longer be falsified by dilution of the tissue water by molten ice water (see part in broken lines in FIG. 6).

The Q-value entered in FIG. 6 is defined as follows.

$$Q = \frac{(R_N - R_H) \cdot 100}{R_H} = \left(\frac{R_N}{R_H} - 1\right) \cdot 100$$

in which $R_N$ is the resistive impedance of the specimen tested measured at a lower frequency and $R_H$ is the resistive impedance of the specimen tested measured at a higher frequency.

The value Q must thus be the greater in the measurement of a tissue element, the smaller is the capacitance, that is the more strongly is the cell wall constructed, a stronger cell wall appearing macroscopically as strength or toughness of the tissue, and thus a smaller Q value pertains to a more tender tissue. If, on the other hand, for example in an animal tissue, the cellular skin, which as a rule is composed of albumen, in the course of storage is decomposed and finally dissolved firstly by albumen-splitting enzymes (for example cathepsin) inherent in the body, and later by those which enter the medium from putrefaction-causing organisms, this signifies an increasing magnification and finally a short-circuit of the capacitance C, whereby the Q-value constantly reduces and approaches the value zero. During the time of rigor mortis of an animal organism obviously chemical and physical modifications (action of the lactic acid formed from the muscle sugar) take place on the cell skin, which increase the Q-value, according to the depth of rigor mortis, not inappreciably beyond the value measured on the living organism. In the case of morbid modifications of the tissue such as swellings, growths, inflamations, as is known the cell structure is modified or partially or completely destroyed, so that according to what was said above such morbidly modified tissues must possess a value deviating from the Q-value of the corresponding healthy tissue.

Although the resistive impedances $R_N$ and $R_H$ measured at the different frequencies are temperature-dependent, the Q-value must be temperature-independent if the measurement of $R_N$ and $R_H$ takes place under the same conditions, which is the case if the measurements are simultaneous or follow one another quickly, because $R_N$ and $R_H$ vary in the same measure with the temperature and these variations are cancelled out by the ratio $R_N/R_H$ provided in the definition of the Q-value. The same applies logically to the influence of the tissue fat content, which affects the resistive impedances $R_N$ and $R_H$, but not the Q-value. It is even conceivable to ascertain roughly the fat content of a tissue simultaneously with the Q-value measurement, from $R_N$ or $R_H$, taking into consideration the measurement temperature and the Q-value.

As mentioned, the specimen to be tested includes, as shown in FIG. 1, a capacitance C which in the A.C. measuring system of the invention comprises a capacitive reactance. The capacitive reactance causes the difference in magnitude between the high frequency impedance of the specimen to be tested and the low frequency impedance of said specimen. This is due to the fact that the capacitive reactance $X_c$ equals $1/\omega C$ or $1/2\pi fC$, where $f$ is the frequency in cycles per second, C is the capacitance in farads and $X_c$ is the capacitive reactance in ohms. The impedance Z is equal to $\sqrt{R^2 + X_c^2}$, where $R^2$ is the square of the resistance in ohms, $X_c^2$ is the square of the capacitive reactance in ohms and Z is the impedance in ohms. Thus, at the lower frequency $X_c$ is high, so that $X_c^2$ is high and Z or $R_N$ is high, whereas at the higher frequency, $X_c$ is low, so that $X_c^2$ is low and Z or $R_H$ is low.

In the following description of circuit arrangements the same references are used for circuit elements which are the same or similar to one another in the various figures.

FIG. 2 shows a block circuit diagram of a first form of embodiment of an apparatus with which the freshness of cellular tissue can be determined and the Q-value represented in FIG. 6 can be indicated. For the resistance measurement there serve as voltage source two oscillators $O_1$ and $O_2$, the frequencies of which differ from one another and preferably are different by several octaves. For the oscillator $O_1$ there is provided an amplifier $V_1$ and for the oscillator $O_2$ an amplifier $V_2$. With the aid of the changeover switch S the alternating current voltage from the oscillator $O_1$ is applied to the measured object F in alternation with the alternating current voltage of different frequency from the oscillator $O_2$. The measured object, in the present case a fish, lies in a series current circuit which in each case contains one of the oscillators and one of the two potentiometers $R_4$ and $R_5$. The voltage drop across the potentiometers $R_4$ and $R_5$ is amplified in the amplifiers $V_1$ or $V_2$, then rectified through the rectifiers $D_1$ and $D_2$ and passed to a quotient meter, for example a cross-coil instrument $I_2$. Calibration of the apparatus is accomplished by an ammeter $I_1$, with which the current from the measuring amplifier $V_1$ can be adjusted to a fixed value by means of the potentiometer $R_4$. The potentiometer $R_4$ is firmly coupled by mechanical linkage with the potentiometer $R_5$, so that finally the measurement result indicated in the instrument $I_1$ is independent of the absolute value of the resistance of the measured object. The switch S can be operated manually or even automatically so that the two branches of the cross-coil instrument are supplied simultaneously and a smooth indication is ensured. The switch S does not need to be a mechanical switch, for obviously it can be replaced by an electronic arrangement. The electrodes used for the measurement should have the largest possible effective area. Surface electrodes of pressed graphite are especially favorable.

In the form of embodiment according to FIG. 3 the two oscillators $O_1'$ and $O_2'$ are connected in series directly with the measured object or specimen F and a measuring resistance $R_6$. In the embodiment of FIG. 3, the switch S of FIG. 2 is omitted and the two measurement frequencies flow superimposed through the measured object F at the same time. The voltage drops across the resistance $R_6$, corresponding to the different frequencies, are tapped with a potentiometer $R_7$ and fed to the two amplifiers $V_1'$ and $V_2'$ tuned to the different frequencies. The two amplifiers $V_1'$ and $V_2'$ then feed a quotient-former, such as a cross-coil measuring instrument $I_2'$, through diodes $D_1'$ and $D_2'$ in a manner similar to that in the embodiment of FIG. 2. Here again only the ratio of the two resistances enters the measurement, since with the aid of the indicator instrument $I_1'$ by adjustment of the tap on the potentiometer $R_7$ one can set a constant current in the one branch of the measurement circuit.

A preferred form of embodiment of a testing and measuring appaartus according to the invention in the form of a block circuit diagram is shown in FIG. 4. In FIG. 4, two oscillators $O_1''$ and $O_2''$ are connected in series with the measured object F and a measurement resistance $R_8$. The voltage drops across the measurement resistance $R_8$ first pass into a pre-amplifier $V_3$ common to both measurement frequencies, which with its output feeds two end amplifiers $V_1''$ and $V_2''$, which then again through two rectifiers $D_1''$ and $D_2''$ operate a measuring instrument. In FIG. 4, the measuring instrument is a measuring bridge with an ammeter $I_3$, which is in the zero branch of a bridge of which two bridge branches are formed by the outputs of the two amplifiers $V_1''$ and $V_2''$. The resistances $R_9$ and $R_{10}$ complete the bridge. In FIG. 2, the taps of the potentiometers $R_4$ and $R_5$ are mechanically coupled to each other and to the indicator $I_1$ by a linkage $B_1$. In FIG. 3, the tap of the potentiometer $R_7$ is mechanically coupled to the indicator $I_1'$ by a linkage $B_2$. The mechanical linkages $B_1$ and $B_2$ may be replaced by an automatic regulator A, which conducts back a regulating voltage, dependent upon the output voltage of the one end amplifier, to the input of the pre-amplifier and influences the amplification degree thereof as shown in FIG. 4.

In the detailed circuit diagram of FIGS. 7 and 8 there are provided two oscillators of which the one oscillator oscillates for example at a frequency of 1000 c.p.s. and the other oscillator for example at a frequency of 16 kc. The current supply to these oscillators and all circuit parts to be described hereinafter is effected from a battery with an operating voltage of for example 9 volts. For the sake of simplicity in the circuit diagrams in FIGS. 7 and 8 only the connection conductors connected with such a battery are represented, and these are provided in the usual manner with the symbols (—) and (+). The battery voltage is more expediently stabilized and made largely independent of temperature and load fluctuations.

The oscillator for the low frequency consists of an oscillator circuit with a condenser $C_1$ and a self-inductance $L_1$. A tap on the oscillator coil $L_1$ leads to the collector on the transistor $T_1$, the emitter of which is connected through a series resistance $R_{11}$ to the positive voltage source. The base of the transistor $T_1$ is connected through a feedback coil $L_2$ to a voltage divider common to the two oscillators. This voltage divider consists of a resistance $R_{12}$ in series connection with a parallel combination of a resitance $R_{13}$ and a condenser $C_2$. The feedback coil $L_2$ is magnetically coupled with the oscillator coil $L_1$ and also with the output winding $L_3$ of the oscillator.

The second oscillator for the higher frequency is provided in a manner similar to that of the above-described oscillator. Here an oscillation circuit with a condenser $C_3$ and an oscillator coil $L_4$ is provided. The coil $L_4$ of the oscillator circuit is connected to the oscillator of the transistor $T_2$, the emitter of which is connected through a resistance $R_{14}$ to the positive voltage source. The feedback coil connected to the base of the transistor $T_2$ is connected to the tap of the aforementioned voltage divider. The output of the oscillator appears on the output winding $L_6$.

A filter member is provided between the two oscillators and the measuring and amplifier circuit to be described hereinafter, in order to exclude undesired feedback effects. This filter member consists of the resistance $R_{15}$, which is connected between the negative pole of the voltage source and the negative voltage connections of the oscillators and a condenser $C_4$ connected in parallel with the oscillators.

The emitter resistances $R_{11}$ and $R_{14}$ are so selected or adjusted in relation to the voltage divider $R_{12}/R_{13}$ that a temperature-stable working point is produced for the transistors $T_1$ and $T_2$ and as far as possible sinusoidal output voltages are produced.

The output windings $L_3$ and $L_6$ of the two oscillators are connected in series with the measured object or specimen F and a measurement resistance $R_m$. The resistance $R_m$ is small in relation to the resistance of the measured object and should be induction-free as far as possible. The voltage drop occurring across the measurement resistance $R_m$ is fed into the amplifier circuit, to be described hereinafter, as input voltage.

The voltage drop across the resistance $R_m$ is passed through the coupling condenser $C_5$, the diode $D_3$ connected in the conductive direction and a further coupling condenser $C_6$ to the base of the transistor $T_3$. The other terminal of the measurement resistance $R_m$ is connected with the positive terminal of the voltage source. A voltage divider having resistances $R_{16}$ and $R_{17}$ serves to adjust the base voltage of the transistor $T_3$. The collector of the transistor $T_3$ is connected through the collector resistance $R_{18}$ with the negative voltage terminal and through a coupling condenser $C_7$ with the base of the following transistor $T_4$. A resistance $R_{19}$ is connected in the emitter circuit of the transistor $T_3$ in series connection with the parallel combination of a resistance $R_{20}$ and condenser $C_8$. In the emitter circuit of the transistor $T_3$ there is further provided a negative feedback resistance $R_{21}$, which is connected with the collector of the transistor $T_4$ and the collector resistance $R_{22}$ thereof. The working point of the transistor $T_4$ is determined with a voltage divider connected between the terminals of the voltage source, which divider comprises the resistances $R_{23}$ and $R_{24}$. The emitter circuit of the transistor $T_4$ includes the parallel combination of a resistance $R_{25}$ and a condenser $C_9$.

The collector of the transistor $T_4$ is connected through a coupling condenser $C_{10}$ with the base of a further transistor $T_5$, which serves as driver for two separate end stages for the high frequency and the low frequency. The working point of the transistor $T_5$ is determined with a voltage divider which is formed by the resistances $R_{26}$ and $R_{27}$. The resistance $R_{28}$ is connected in the collector circuit of the transistor $T_5$ and the resistance $R_{29}$ is connected in the emitter circuit of the transistor $T_5$. The two separate end stages of the amplifier are fed by the connection point between the resistance $R_{28}$ and the collector of the transistor $T_5$. A coupling condenser $C_{11}$ couples the end amplifier for the high frequency and is connected to the base of the transistor $T_6$. A coupling condenser $C_{12}$ couples the amplifier for the low frequency and is connected to the base of the transistor $T_7$. A high-pass filter for the transistor $T_6$ and a low-pass filter for the transistor $T_7$ are connected in the respective inputs of the transistors $T_6$ and $T_7$. The high-pass filter comprises the correspondingly dimensioned coupling condenser $C_{11}$ and the voltage divider of the transistor $T_6$, said voltage divider comprising the two resistances $R_{30}$ and $R_{31}$. The high-pass filter also includes the input resistance of the transistor $T_6$. The low-pass filter for the transistor $T_7$ comprises the series resistance $R_{32}$, the coupling condenser $C_{12}$, which has no influence upon the low-pass filter function, and the transverse condenser $C_{13}$, which is connected with the positive terminal of the voltage source. For the determination of the working point of the transistor $T_7$ a further voltage divider is utilized, which voltage divider consists of the resistances $R_{33}$ and $R_{34}$. The emitter circuits of the two transistors $T_6$ and $T_7$ contain parallel combinations of a resistance $R_{35}$ and $R_{36}$ and parallel condensers $C_{14}$ and $C_{15}$. In the collector circuits of the two transistors are connected resonance circuits tuned to the corresponding frequencies. The transistor $T_6$ resonance circuit comprises the primary winding of the transformer $Tr_1$ and the parallel condenser $C_{16}$ and the transistor $T_7$ resonance circuit comprises the primary winding $Tr_2$ and the parallel condenser $C_{17}$. The inputs of the two end amplifiers are tapped on the secondary windings of the transformers $Tr_1$ and $Tr_2$ respectively. Between the secondary windings of the transformers $Tr_1$ and $Tr_2$ and the emitter path of the driver transistor $T_5$ are negative feedback paths, in which the resistances $R_{37}$ and $R_{38}$ respectively are connected. The resistance $R_{38}$ is preferably variable, in order to determine the zero point of the measuring instrument fed by the two end stages, which is to be described hereinafter.

The output voltages in the secondary windings of the two transformers $Tr_1$ and $Tr_2$ are fed through diodes $D_4$, $D_5$ and $D_6$, $D_7$ in a voltage doubler circuit with the condensers $C_{16}'$, $C_{17}'$ and $C_{18}$, $C_{19}$ respectively with opposite polarity to a potentiometer $R_{39}$. The tap of the potentiometer $R_{39}$ feeds a measurement amplifier.

The measurement amplifier in the embodiment of FIGS. 7 and 8 is formed as a bridge. The tap of the potentiometer $R_{39}$ is connected to the base of the transistor $T_8$, which is connected through its emitter resistance $R_{40}$ to the positive terminal of the voltage source. The collector of the transistor $T_8$ is connected through a resistance combination with the negative terminal of the voltage source. This resistance combination, which is formed for temperature compensation, may comprise for example an ohmic resistance $R_{41}$ in parallel connection with a resistance $R_{42}$ with a negative temperature coefficient. In the two other bridge branches, in series connection are an ohmic resistance $R_{43}$ and a diode $D_8$. The actual indicator instrument $I_3'$ is connected in the zero branch of the bridge between the connection points of diode $D_8$ and resistance $R_{43}$ and of the collector of the transistor $T_8$ and the resistance combination $R_{41}$ and $R_{42}$.

The regulating section respresented as regulator A in FIG. 4 extends in the more detailed circuit diagram of FIGS. 7 and 8 from the output of the end amplifier for the higher frequency with the transistor $T_6$ to the input of the input transistor $T_3$. The regulating path represented generally as regulator $A'$ is connected at the amplifier input through the two series-connected resistances $R_{44}$ and $R_{45}$ to the connection point between the diode $D_3$ and the condenser $C_6$. A condenser $C_{20}$ is connected from the connection point of the two resistances $R_{44}$ and $R_{45}$ to the positive battery terminal, in order to short-circuit the alternating current for the regulating path. For reasons to be explained in greater detail hereinafter, a further voltage divider comprising a resistance $R_{46}$ and a Zener diode Z is connected to the positive-biased electrode of the diode $D_3$.

The regulating circuit arrangement $A'$ represented in FIG. 7 merely as a rectangle is represented in greater detail in FIG. 9. The input lead $A_1$ represented on the right in FIG. 9 is connected to the output of the end amplifier for the higher frequency and is connected to the common connection point between diode $D_4$, condenser $C_{17}'$ and the one terminal of the resistance $R_{39}$. The output lead $A_2$ of the regulator, represented on the left in FIG. 9, is connected to the resistance $R_{45}$ in FIG. 7. The negative regulating signal conducted back through the lead $A_1$ is fed to the base of the transistor $T_9$. A common emitter resistance $R_{47}$ is provided for the transistor $T_9$ and the transistor $T_{10}$. The transistor $T_{10}$ serves for the production of a reference voltage, that is it fixes the emitter voltage for the transistor $T_9$ and ensures that this voltage remains constant independently of the current in the transistor $T_9$. The working point of the transistor $T_{10}$, and thus also the voltage across the resistance $R_{47}$, is set by the potentiometer $R_{48}$, which is connected between the positive and negative battery terminals. The collector of the transistor $T_{10}$ is connected directly to the negative battery terminal. The collector of the transistor $T_9$ is connected to the base of a transistor $T_{11}$. The collector of the transistor $T_9$ is connected through a collector resistance $R_{49}$ to the negative battery terminal. The base-collector section of the transistor $T_9$ is bridged by a condenser $C_{21}$ for alternating current negative feedback. The condenser $C_{21}$ at higher frequencies effects practically a short-circuit of the base-collector section. The collector of the transistor $T_{11}$ is connected directly to the negative voltage source. The emitter of the transistor $T_{11}$ is connected to the output lead $A_2$. The emitter-base section of the transistor $T_{11}$ is bridged by a diode $D_9$. The diode $D_9$ limits the regulating current flowing at maximum through the lead $A_2$, because the base-emitter voltage of the transistor $T_{11}$ cannot become more negative than corresponds to the maximum voltage drop across the diode $D_9$ connected in the conducting direction, even if the transistor $T_9$ is blocked.

The circuit arrangement described with reference to FIGS. 7, 8 and 9 operates as follows.

Between the electrodes E of the apparatus, which can for example be surface electrodes of pressed graphite or corresponding conductive coatings with high specific area on special gloves, as shown in FIG. 11, there is placed an object or specimen for measurement, for example a fish F. When the apparatus is switched on, two alternating currents of different frequency flow through the measured object F. According to the particular constitution of the measured objects, different voltage drops occur across the series resistance $R_m$, and such voltages are applied via the condenser $C_5$ to the measuring amplifier.

FIG. 11 shows a front view and a back view of a glove which may be utilized to hold a specimen and apply the electrodes thereto. The electrodes E are supported by two fingers of the glove of insulating material and are connected to the circuit by suitable electrical conductors.

In the state of rest, that is before the application of a measured object, the transistor $T_{11}$ (FIG. 9) is fully conductive, since the transistor $T_9$ is blocked, because its base is connected to positive potential and no restoring voltage is produced. Due to the conductivity of the transistor $T_{11}$ a relatively powerful current flows through the lead $A_2$ and the series circuit of resistance $R_{45}$, resistance $R_{44}$, diode $D_3$ and resistance $R_{46}$, which current renders the diode $D_3$ conductive and thus of low ohmic value. The potential at the connection point between the coupling condenser $C_5$ and the diode $D_3$ is determined by a voltage divider comprising the resistance $R_{46}$ and the Zener diode Z. The transverse current through this voltage divider is so selected that the Zener diode functions in its most favorable operating range and a current flow is produced which is large in relation to the above-mentioned regulating current from the lead $A_2$ through the resistances $R_{44}$, $R_{45}$, $R_{46}$ and the diode $D_3$. The Zener diode Z can possibly be replaced by a simple resistance, if it is ensured that the transverse current through this voltage divider is sufficiently large. The voltage divider with resistance $R_{46}$ and Zener diode Z fixes a cold reference point relative to direct current for the circuit arrangement and ensures that the transistors $T_9$ and $T_{11}$ of the automatic regulator are operated in the middle region of their operating characteristic lines.

After the insertion of an object or specimen F for measurement, first a measuring current flows through the coupling condenser $C_5$, the diode $D_3$ and the further coupling condenser $C_6$ to the base of the input transistor $T_3$. This current is amplified in a manner known per se in the transistors $T_3$ and $T_4$ and then passes through the coupling condenser $C_{10}$ to the base of the driver transistor $T_5$ for the two end stages with the transistors $T_6$ and $T_7$. An alternating current voltage occurs across the secondary winding of the transformer $Tr_1$ which is dependent upon the voltage drop of alternating current of high frequency across the resistance $R_m$. In corresponding manner, an output voltage occurs across the secondary winding of the transformer $Tr_2$ which is dependent upon the voltage drop of alternating current of lower frequency across the measurement resistance $R_m$. These two above-mentioned alternating current output voltages are rectified by the diodes $D_4$ to $D_7$ and then passed with opposite polarity to the potentiometer $R_{39}$, the tap of which is connected to the output measurement amplifier. By reason of the amplification which is selected as very great, first after the diode $D_4$ a very high voltage is produced, which is used as input for the regulator and is fed through the lead $A_1$ to the transistor $T_9$. The originally blocked transistor $T_9$ is made conductive by reason of the great regulator input signal at its base. Thus, a high voltage drop occurs at the collector resistance $R_{49}$, so that the transistor $T_{11}$ is more or less blocked. The current in the lead $A_2$ thus decreases. Thus, the diode $D_3$ becomes of higher ohmic value and the input current for the measurement amplifier is reduced, because the voltage divider ratio between the diode $D_3$ and the resistance $R_{44}$ is increased. Last, by such action of the regulator the output signal on the diode $D_4$ decreases, until a state of equilibrium establishes itself which is determined by the voltage drop across the resistance $R_{47}$ and/or by the setting of the potentiometer $R_{48}$. Thus, the circuit arrangement according to FIGS. 7 and 8 ensures exactly a quotient formation which is independent of the absolute resistances of the measured object.

For the calibration and adjustment of the circuit arrangement according to FIGS. 7 and 8, first an ohmic resistance is interposed in place of the measured object F, so that the voltage drops across the measurement resistance $R_m$ are of equal magnitude for any desired frequencies. Under these conditions the output voltages on the end amplifiers $T_6$ and $T_7$ must be oppositely equal. If they are not so, this requisite equilibrium can be established by variation of the resistance $R_{38}$.

In practice the tap of the potentiometer $R_{39}$ can be set so that a pre-current flows through the measurement bridge and the transistor $T_8$ may operate in a more favorable part of its characteristic curve. In order to enable the measuring instrument $I_3'$ connected in the zero branch to be brought to the zero point of the scale despite the pre-current, a resistance $R_{43}$ and a diode $D_8$ are connected in the two bridge branches to the right in FIG. 8. The potential across the instrument $I_3'$ at the terminal remote from the transistor $T_8$ is largely independent of the current flow through the instrument and is practically determined only by the electric data of the diode $D_8$. By selection of the resistance $R_{40}$ the measuring bridge can be set so that at the maximum ratio between the outputs of the end amplifiers $T_6$ and $T_7$ a full deflection is produced. The tap on the potentiometer $R_{39}$ renders possible the adjustment of the electric zero point of $I_3'$. The aforediscussed variation of the resistance $R_{38}$ serves only to set an equilibrium between the outputs of the two end amplifiers $T_6$ and $T_7$.

If, as assumed previously, an object F or specimen for measurement is introduced between the electrodes E, the voltage across the condenser $C_{17}$ in the end stage $T_6$ adjusts itself to a voltage which depends upon the setting of the potentiometer $R_{48}$. By reason of the regulation a voltage is produced across the condenser $C_{19}$ which is in the same ratio to the voltage across the condenser $C_{17}$ as the voltage drops across the measurement resistance $R_m$ which are to be measured at the different frequencies. Since the resistance $R_m$ is in series with the measured object F, this voltage ratio across the two condensers $C_{17}$ and $C_{19}$ also corresponds to the Q-value to be determined on the measured object.

The scale of the instrument $I_3'$ can be calibrated in quality or freshness values. In the examination of usable fish the scale can be calibrated for example in reserve-ice-storage days. By "reserve-ice-storage days" is understood the number of days which the tested usable fish can still be kept in a usable state under predetermined conditions on ice.

The result obtained at the tap of the potentiometer $R_{39}$ is, as already explained previously, substantially independent of temperature. In order also to exclude temperature fluctuations in the measuring amplifier connected thereto, a resistance $R_{42}$ having a negative temperature coefficient is connected in parallel with the bridge resistance $R_{41}$.

FIG. 10, which illustrates a number of components which also are represented in FIG. 8, shows another embodiment of the indicator circuit. As different from the embodiment of FIG. 8, the voltages applied to the condensers $C_{17}'$ and $C_{19}$ of FIG. 10 are applied to load resistances $R_{50}$ and $R_{51}$, which are each connected at one terminal to a measuring instrument $I_4$. The instrument $I_4$ indicates the difference of the voltage drops across the resistances $R_{50}$ and $R_{51}$. The current flow through the instrument $I_4$ must be small in relation to the current flow through the resistances $R_{50}$ and $R_{51}$. A further difference from the circuit arrangement of FIG. 8 consists in that both ends of the secondary winding of the transformers $Tr_1'$ and $Tr_2'$ are connected to diodes $D_{11}$, $D_{12}$, $D_{13}$, and $D_{14}$. These diodes are connected together in pairs with the corresponding electrodes of the diodes $D_{11}$ and $D_{12}$ connected to each other and to the condenser $C_{17}'$ and with the corresponding electrodes of the diodes $D_{13}$ and $D_{14}$ connected to each other and to the condenser $C_{19}$. The middle tap of the secondary winding of the transformer $Tr_1'$ is connected with the positive voltage source. The middle tap of the secondary winding of the transformer $Tr_2'$ on the other hand is connected via a diode $D_{10}$ to the positive battery terminal. The diode $D_{10}$ is interposed betwen the positive battery terminal and the emitter resistance $R_{36}'$ of the transistor $T_7$. The diode $D_{10}$ functions as follows. While voltage variations are adjusted out in the end amplifier transistor $T_6$ by the automatic regulating circuit, this is not the case in the second end amplifier transistor $T_7$. When, for example, the temperature increases, the conductivity of the diodes $D_{13}$ and $D_{14}$ increases and thus the measurement result is falsified. In order to counter such falsifications the diode $D_{10}$ is positioned to conduct the emitter current of the transistor $T_7$ therethrough. If for example due to an increase of temperature the conductivity of the diodes $D_{13}$ and $D_{14}$ is increased, the direct current voltage applied to the condenser $C_{19}$ rises, so that the measurement result is falsified. The diode $D_{10}$ counters this effect, because its resistance decreases with rising temperature and delivers a smaller proportion of the voltage applied to the condenser $C_{19}$. An optimum temperature compensation is easily possible by appropriate dimensioning of the current flow through the diode $D_{10}$. The diode $D_{10}$ is connected in the emitter circuit of the transistor $T_7$ for reasons of current economy, because a current flow may be provided through the diode $D_{10}$ by another resistance connected to the negative voltage source.

Disturbing influences of the ambient temperature, which act differently upon the two end amplifiers, because the regulator influences only one of the two end amplifiers, may be equally well compensated for or counteracted by other means. Thus, for example, it is possible to counteract temperature variations by utilization of resistances with negative temperature coefficients in series connection with the resistance $R_{38}$, or connected between potentiometer $R_{39}$ and the output of the end amplifier transistor $T_6$ or by appropriate dimensioning of the resistance $R_{42}$ in the measuring amplifier.

Since the apparatus according to the invention is usable for continuous measurement after it is once set, it can be used with advantage also in automatic sorting and testing machines, where in dependence upon the measurement result achieved direction-determining devices are set in order to distribute the measured objects according to their classification. Incidentally, the apparatus, as already mentioned at the outset, is usable not only for fish but also for fruit and vegetables. Along these lines in the above description and in the following claims the reference to vegetable and animal cellular tissues is to be interpreted so widely that animal products are also covered thereby.

While various embodiments of the invention have been described in detail it will be obvious to those skilled in the art that the invention may be practiced otherwise without departing from its spirit and scope.

We claim:

1. A method for testing the physiological condition of vegetable and animal cellular tissues having a cell wall and a cell content and having an equivalent circuit comprising the resistance of the intercellular liquid connected in series to a closed loop comprising the series connection of the resistance of the cell content, the resistance of the cell wall and the capacitance produced by current flow due to charge blockage on the cell wall, comprising the steps of measuring the impedance of an object comprising cellular tissues to be tested at an A.C. having a first frequency applied to said object;

measuring the impedance of said object at an A.C. having a second frequency different from said first frequency applied to said object;

dividing the impedance measurement at the first frequency by the impedance measurement at the second frequency to provide a ratio which is proportional to the cellular condition of said object and thus indicates the suitability of said object for human consumption;

measuring a first voltage equivalent to said first frequency A.C.;

measuring a second voltage equivalent to said second frequency A.C.; and maintaining constant one of said first and second voltages.

2. A method as claimed in claim 1, wherein said first frequency is lower than said second frequency.

3. A method as claimed in claim 2, wherein said first and second frequency measurements are made simultaneously and the measurements are repeated alternately in rapid succession.

4. A method as claimed in claim 2, wherein the maximum magnitude of said second frequency is several hundred kilocycles per second.

5. A method as claimed in claim 2, wherein a multiple frequency noise current is applied to said object.

6. A method as claimed in claim 2, wherein the current applied to said object is less than one milliampere.

7. A method as claimed in claim 2, wherein the A.C. is applied to said object via two resistors connected in series therewith, one of said resistors being connected in series with an A.C. source having said first frequency and the other of said resistors being connected in series with an A.C. source having said second frequency and the voltages across said two resistors are measured by two frequency responsive circuits.

8. A method as claimed in claim 2, wherein the A.C. is applied to said object via a resistor connected in series therewith and the voltage is measured across said resistor as an indication of the impedance of said object.

9. A method as claimed in claim 8, wherein the voltage across said resistor is measured by two frequency responsive circuits.

10. Apparatus for testing the physiological condition of vegetable and animal cellular tissues having a cell wall and a cell content and having an equivalent circuit comprising the resistance of the intercellular liquid connected in series to a closed loop comprising the series connection of the resistance of the cell content, the resistance of the cell wall and the capacitance produced by current flow due to charge blockage on the cell wall, comprising first supply means for applying an A.C. having a first frequency to an object comprising tissues;

first measuring means for measuring the impedance of said object at said first frequency;

second supply means for applying an A.C. having a second frequency different from said first frequency to said object, each of said first and second supply means comprising an oscillator and a resistor connected in series with the oscillators and with said object, said resistor having a low inductance and a resistance which is lower than the impedance of said object;

second measuring means for measuring the impedance of said object at said second frequency, said first and second measuring means comprising means for measuring the voltage across the resistor of said first and second supply means, amplifying means for amplying the voltage across said resistor and for separating the voltage at said second frequency from the voltage at said first frequency and rectifying means for rectifying the separated amplified first and second frequency voltages; and arithmetic means for dividing the impedance measurement at the first frequency by the impedance measurement at the second frequency to provide a ratio of the first frequency rectified voltage to the second frequency rectified voltage wihch is proportional to the cellular condition of said object and thus indicates the suitability of said object for human consumption, said arithmetic means including feedback means connected between the rectifying means of one of said first and second measuring means and the amplifying means thereof for maintaining constant one of said first and second frequency rectified voltages.

11. Apparatus as claimed in claim 10, wherein said first frequency is lower than said second frequency.

12. Apparatus for testing the physiological condition of vegetable and animal cellular tissues having a cell wall and a cell content and having an equivalent circuit comprising the resistance of the intercellular liquid connected in series to a closed loop comprising the series connection of the resistance of the cell content, the resistance of the cell wall and the capacitance produced by current flow due to charge blockage on the cell wall, comprising first supply means for applying an A.C. having a first frequency to an object comprising tissues;
first measuring means for measuring the impedance of said object at said first frequency;
second supply means for applying an A.C. having a second frequency different from said first frequency to said object;
second measuring means for measuring the impedance of said object at said second frequency;
arithmetic means for dividing the impedance measurement at the first frequency by the impedance measurement at the second frequency to provide a ratio which is proportional to the cellular condition of said object and thus indicates the suitability of said object for human consumption;
a pair of spaced graphite electrodes; and
support means for supporting said electrodes in electrical contact with said object, each of said first and second supply means comprising oscillator means connected to said electrodes.

13. Apparatus as claimed in claim 12, wherein said support means comprise a glove of electrically insulating material having a palm covering portion and a plurality of finger covering portions extending from said palm covering portion, one of said electrodes being affixed to one of said finger covering portions and the other of said electrodes being affixed to another of said finger covering portions.

14. Apparatus as claimed in claim 10, wherein said amplifying means comprises an input including a voltage divider having a diode biased for conduction and an input resistor connected in series with said diode, said amplifying means being connected to a common point in the connection between said diode and said input resistor and said feedback means being connected to one end of said voltage divider.

15. Apparatus as claimed in claim 10, wherein said amplifying means comprises an input including a voltage divider having a temperature dependent resistor and a temperature independent resistor connected in series with said temperature dependent resistor, said feedback means being connected to one end of said voltage divider.

16. Apparatus as claimed in claim 10, wherein said amplifying means comprises a coupling capacitor connected to said resistor, said amplifying means being connected to said coupling capacitor, voltage means for energizing said amplifying means, and a voltage divider having ends connected to said voltage means, a Zener diode, an input resistor connected to said Zener diode and a midpoint between said Zener diode and said input resistor connected to said coupling capacitor.

17. Apparatus as claimed in claim 10, wherein said arithmetic means includes indicator means having a zero point, and wherein said amplifying means comprises a pair of amplifier stages respetcively tuned to pass high frequencies and low frequencies, a common driver stage for said amplifier stages, and negative feedback circuits from each of said amplifier stages to said common driver stage, one of said negative feedback circuits being variable for adjusting the zero point of said indicator means.

References Cited by the Examiner

UNITED STATES PATENTS

| | | | |
|---|---|---|---|
| 1,658,953 | 2/1928 | Theremin. | |
| 1,987,244 | 1/1935 | Moore | 324—65 |
| 2,072,705 | 3/1937 | Bloomheart. | |
| 3,046,537 | 7/1962 | Dow | 324—61 |
| 3,085,566 | 4/1963 | Tolles | 128—2.1 |
| 3,155,899 | 11/1964 | Davidson | 324—61 |
| 3,155,900 | 11/1964 | Hanken | 324—61 |
| 3,155,901 | 11/1964 | Hanken | 324—61 |
| 3,155,902 | 11/1964 | Walls | 324—61 |

FOREIGN PATENTS

| | | |
|---|---|---|
| 492,341 | 9/1938 | Great Britain. |
| 622,470 | 5/1949 | Great Britain. |

RICHARD A. GAUDET, *Primary Examiner.*

SIMON BRODER, ROBERT E. MORGAN, *Examiners.*